US011307638B2

(12) United States Patent
Li et al.

(10) Patent No.: US 11,307,638 B2
(45) Date of Patent: Apr. 19, 2022

(54) SECURELY PROVIDING MULTIPLE WAKE-UP TIME OPTIONS FOR PCI EXPRESS

(71) Applicant: Intel Corporation, Santa Clara, CA (US)

(72) Inventors: Ang Li, Coquitlam (CA); Kuan Hau Tan, Coquitlam (CA); Eng Hun Ooi, Penang (MY)

(73) Assignee: Intel Corporation, Santa Clara, CA (US)

( * ) Notice: Subject to any disclaimer, the term of this patent is extended or adjusted under 35 U.S.C. 154(b) by 499 days.

(21) Appl. No.: 16/217,204

(22) Filed: Dec. 12, 2018

(65) Prior Publication Data

US 2019/0235612 A1    Aug. 1, 2019

(51) Int. Cl.
 *G06F 1/00* (2006.01)
 *G06F 1/3234* (2019.01)
 *G06F 16/23* (2019.01)
 *G06F 1/3287* (2019.01)
 *G06F 1/3215* (2019.01)
 *G06F 1/3206* (2019.01)

(52) U.S. Cl.
 CPC .......... *G06F 1/3278* (2013.01); *G06F 1/3206* (2013.01); *G06F 1/3215* (2013.01); *G06F 1/3234* (2013.01); *G06F 1/3287* (2013.01); *G06F 16/23* (2019.01)

(58) Field of Classification Search
 CPC .... G06F 1/3206; G06F 1/3215; G06F 1/3234; G06F 1/3278; G06F 1/3287; G06F 13/4241; G06F 16/23
 See application file for complete search history.

(56) References Cited

U.S. PATENT DOCUMENTS

2016/0216758 A1    7/2016  Kachare et al.
2016/0363986 A1   12/2016  Swarbrick et al.
2017/0068626 A1    3/2017  Lais et al.

FOREIGN PATENT DOCUMENTS

EP    2778838 A2    9/2014

OTHER PUBLICATIONS

Extended European Search Report for U.S. Appl. No. 16/217,204, dated May 28, 2020, 6 pages.
PCI Express® Base Specification Revision 4.0 Version 1.0 Sep. 27, 2017 Section 5.

*Primary Examiner* — Nitin C Patel
(74) *Attorney, Agent, or Firm* — Compass IP Law PC

(57) ABSTRACT

Methods, apparatus, and systems for securely providing multiple wake-up time options for PCI Express (PCIe) devices. Under one approach, Vendor Define Messages (VDMs) are exchanged between a host application layer in a host and a device application layer in a PCIe endpoint device coupled to the host via a PCIe link to effect changes to the L1.2 Substate exit time of a PCIe device. Under another approach, Vendor-Specific Extended Capability (VSEC) structures are exchanged between a host application layer and a device application layer to effect the changes. The VDMs and VSEC structures may also be used to enable a host to read Tpower_on capability information defining power modes supported by a PCIe device. Additionally, VSEC implementations are provided that implement VSEC components in the PCIe device transaction layer or the PCIe device application layer.

24 Claims, 13 Drawing Sheets

| Bit Location | Register Description | Attributes |
|---|---|---|
| 1:0 | T_POWER_ON Scale – Specifies the scale used for T_POWER_ON Value.<br><br>Range of Values<br>00b = 2 μs<br>01b = 10 μs<br>10b = 100 μs<br>11b = Reserved<br><br>Required for all Ports that support L1.2, otherwise this field is of type RsvdP.<br><br>This field must only be modified when the ASPM L1.2 Enable and PCI-PM L1.2 Enable bits are both Clear. The Port behavior is undefined if this field is modified when either the ASPM L1.2 Enable and/or PCI-PM L1.2 Enable bit(s) are Set. | RW/ RsvdP<br><br>⎯ 102 |
| 2 | Reserved | RsvdP |
| 7:3 | T_POWER_ON Value – Along with the T_POWER_ON Scale sets the minimum amount of time (in μs) that the Port must wait in L1.2.Exit after sampling CLKREQ# asserted before actively driving the interface.<br><br>T_POWER_ON is calculated by multiplying the value in this field by the value in the T_POWER_ON Scale field.<br><br>This field must only be modified when the ASPM L1.2 Enable and PCI-PM L1.2 Enable bits are both Clear. The Port behavior is undefined if this field is modified when either the ASPM L1.2 Enable and/or PCI-PM L1.2 Enable bit(s) are Set.<br><br>Default value is 00101b<br>Required for all Ports that support L1.2, otherwise this field is of type RsvdP. | RW/ RsvdP<br><br>⎯ 104 |
| 31:8 | Reserved | RsvdP |

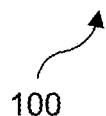

| Name | Code[7:0] (b) | Routing r[2:0] (b) | Support | | | | Description/Comments |
|---|---|---|---|---|---|---|---|
| | | | RC | Ep | Sw | Br | |
| Vendor_Defined Type 0 | 0111 1110 | 000, 010, 011, 100 | See Note 1. | | | | Triggers detection of UR by Completer if not implemented. |
| Vendor_Defined Type 1 | 0111 1111 | 000, 010, 011, 100 | See Note 1. | | | | Silently discarded by Completer if not implemented. |

Note 1. Transmission by Endpoint/Root Complex/Bridge is implementation specific. Switches must forward received Messages using Routing r[2:0] field values 00b, 010b, and 011b.

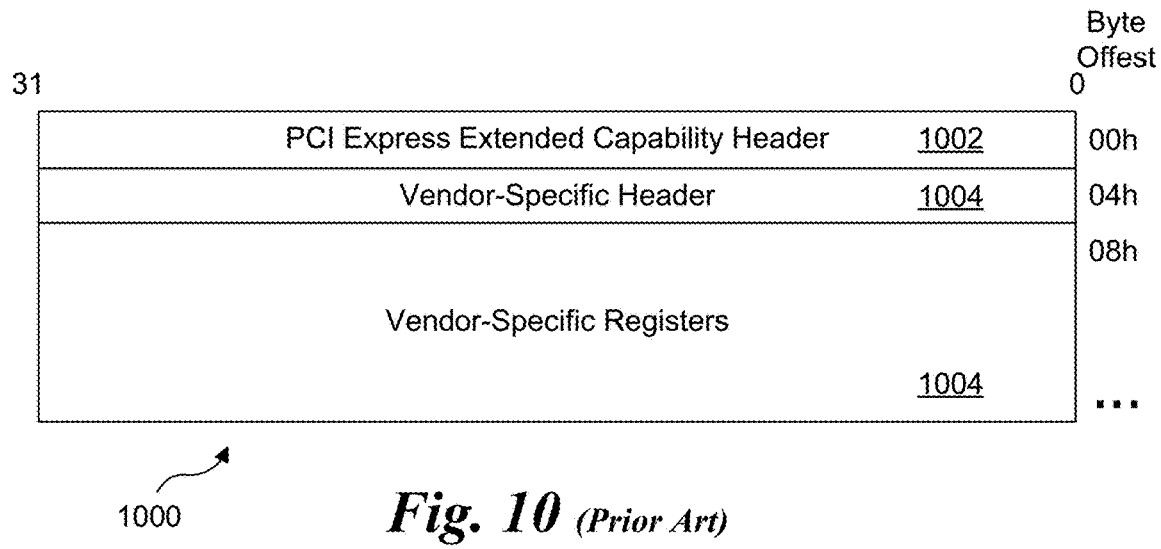

Fig. 10 *(Prior Art)*

| Bit Location | Register Description | Attributes |
|---|---|---|
| 15:0 | PCI Express Extended Capability ID – This field is a PCI-SIG defined ID number that indicates the nature and format of the Extended Capability. Extended Capability ID for the Vendor-Specific Extended Capability is 000Bh. | RO |
| 19:16 | Capability Version – This field is a PCI-SIG defined version number that indicates the version of the Capability structure present. Must be 1h for this version of the specification. | RO |
| 31:20 | Next Capability Offset – This field contains the offset to the next PCI Express Capability structure or 000h if no other items exist in the linked list of Capabilities. For Extended Capabilities implemented in Configuration Space, this offset is relative to the beginning of PCI-compatible Configuration Space and thus must always be either 000h (for terminating list of Capabilities) or greater than 0FFh. | RO |

Fig. 11 *(Prior Art)*

| Bit Location | Register Description | Attributes |
|---|---|---|
| 15:0 | VSEC ID – This field is a vendor-defined ID number that indicates the nature and format of the VSEC structure.<br>Software must qualify the Vendor ID before interpreting this field. | RO |
| 19:16 | VSEC Rev – This field is a vendor-defined version number that indicates the version of the VSEC structure.<br>Software must qualify the Vendor ID and VSEC ID before interpreting this field. | RO |
| 31:20 | VSEC Length – This field indicates the number of bytes in the entire VSEC structure, including the PCI Express Extended Capability header, the Vendor-Specific header, and the Vendor-Specific registers. | RO |

1004

SECURELY PROVIDING MULTIPLE WAKE-UP TIME OPTIONS FOR PCI EXPRESS

BACKGROUND INFORMATION

Peripheral Component Interconnect Express, also known as PCI Express or PCIe is a high-speed serial interconnect that is widely used in today's computers and servers. PCI Express has evolved over several generations, with the third generation of PCI Express (also referred to as Gen 3) currently being the most common, and the fourth generator (Gen 4) being recently introduced. The PCI Express 3.0 Based specification, revision 3.0 was published by PCI-SIG® in November 2010. The PCI Express 3.1 specification, was released in November 2014. PCI Express 4.0 was officially announced in June 2017 by PCI-SIG®.

Both PCI Express 3.1 and PCI Express 4.0 include provisions for power management pertaining to an L1.2 Substate, which is used to define a "wake-up" time for PCIe devices. Unfortunately, the PCIe Specifications only architected one L1.2-exit timing parameter for the system to configure, which prevents the system from applying more fine-tuned power and performance trade-off policies when a device is in L1.2 Substate.

For example, in current power-saving-capable computing systems, if a PCIe component supports the L1.2 Substate (either PCI-PM L1.2 or ASPM (Active State Power Management) L1.2), the PCIe 4.0 Specification defines only one timing parameter, namely T_POWER_ON. T_POWER_ON is the minimum amount of time that each component must wait in the L1.2.Exit Substate after sampling CLKREQ # asserted before actively driving the interface to ensure no device is ever actively driving into an unpowered component.

FIG. 1 shows the format of the L1 PM Substates Control 2 Register defined in Section 7.8.3.4 of the PCIe 4.0 Specification. As illustrated, T_POWER_ON has two fields that have values that may be changed: a 2-bit T_POWER_ON Scale field 102 and a 5-bit T_POWER_ON Value field 104. The T_POWER_ON parameter is calculated by multiplying the value of T_POWER_ON_SCALE by the value of T_POWER_ON_VALUE in the L1 PM Substates Control 2 Register.

Per the PCIe 4.0 Specification, T_POWER_ON_SCALE and T_POWER_ON_VALUE field values must only be modified when the ASPM L1.2 Enable and the PCI-PM L1.2 Enable bits are both Clear. Accordingly, in order to change the T_POWER_ON_SCALE and T_POWER_ON_VALUE field values, the host must first issue a first Configuration Write Request (CfgWr) transaction layer packet (TLP) to the PCIe device targeting L1 PM Substates Control 1 Register to clear the ASPM L1.2 Enable and the PCI-PM L1.2 Enable bits, wait for return of a first completion TLP from the device indicating the bits have been cleared, then change the T_POWER_ON_SCALE and T_POWER_ON_VALUE by issuing a second CfgWr TLP targeting the L1 PM Substates Control 2 Register, wait for a second successful completion TLP, then set the ASPM L1.2 Enable and the PCI-PM L1.2 Enable bits back to 1 by issuing a third CfgWr TLP targeting the L1 PM Substates Control 1 Register, and again wait for a third completion TLP. In summary, the host must issue three Configuration Write Requests to the PCIe device, and wait for three respective Completions from Device, which results in added overhead and latency.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1 is a table showing the format of the L1 PM Substates Control 2 Register, as defined in the PCIe 4.0 Specification;

FIG. 2 is a table specifying aspects of a Vendor Defined Message (VDM), as defined in the PCIe 4.0 Specification;

FIG. 3 is a diagram defining the header format of a VDM;

FIG. 4 is a diagram illustrating the PCI-SIG-Defined VDM header format;

FIG. 10 is a diagram illustrating allocation of register fields in a Vendor-Specific Extended Capability (VSEC) structure, as defined by the PCIe 4.0 Specification;

FIG. 11 is a table defining fields in a PCI Express Extended Capability Header, as defined by the PCIe 4.0 Specification;

FIG. 12 is a table defining fields for a VSEC vendor-specific header, as defined by the PCIe 4.0 Specification;

DETAILED DESCRIPTION

Figure 5:
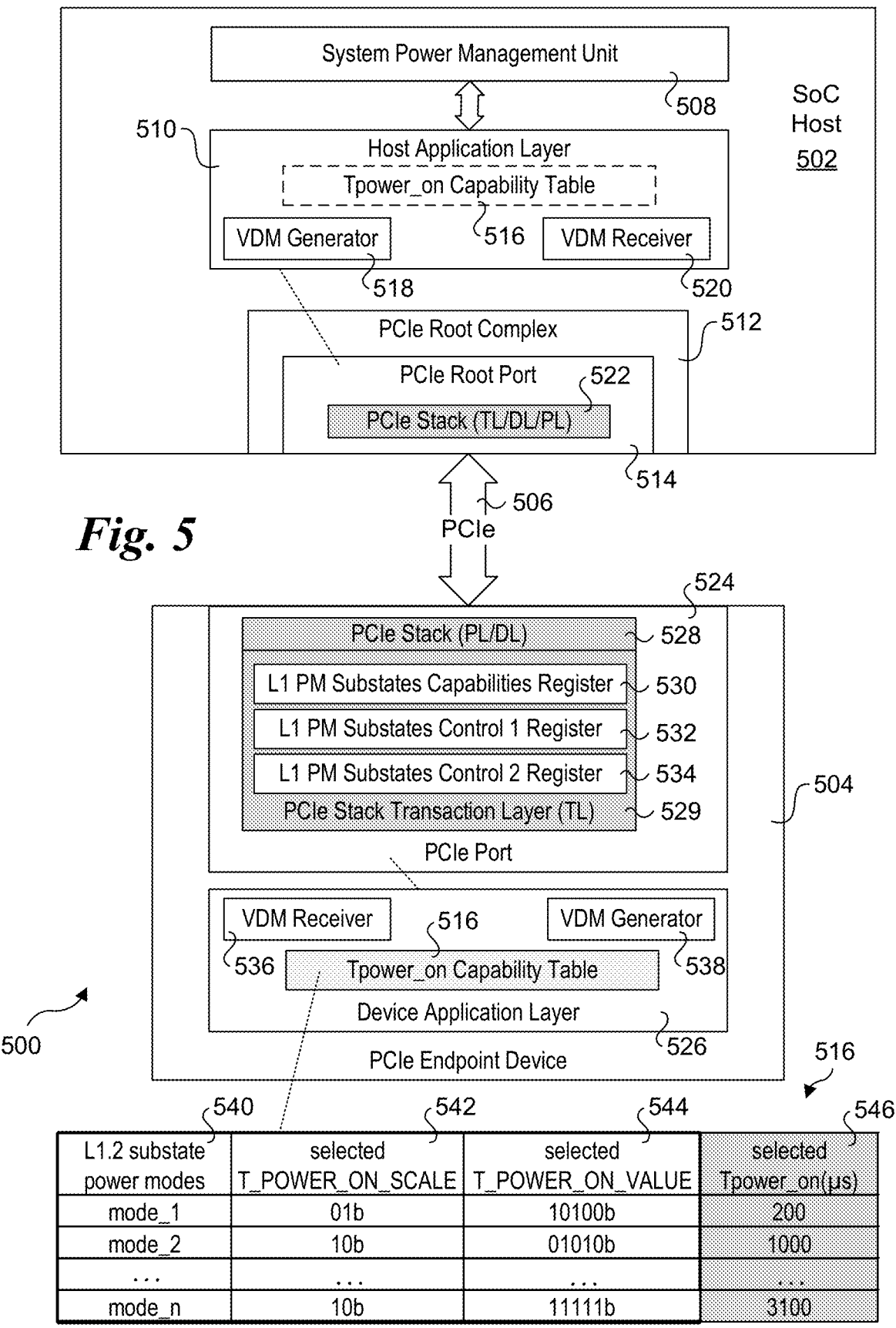
FIG. 5 is a diagram of a system architecture that may be used to implement a host-initiated change to the L1.2 exit time, according to one embodiment.

Embodiments of methods, apparatus, and systems for securely providing multiple wake-up time options for PCI Express devices are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

With dramatically increasing use of new power-saving features and requirements seen through the client and enterprise storage industry, many system implementations would prefer more sophisticated power-saving strategies and more power-saving states granularity for PCIe devices than is available in the L1.2 Substate under the current PCIe 4.0 Specification. In addition, as described above, making changes to the L1.2 Exit time requires three Configuration Write Requests and waiting for three respective Completions. These problems are addressed by embodiments described herein, which disclose techniques that enable PCIe devices and hosts to dynamically choose different L1.2-exit time options during ongoing run-time operations, thus providing greater flexibility and granularity than available under the PCIe 4.0 Specification. As described in further detail below, secure L1.2-exit time information communication mechanisms between host and an L1.2-capable PCIe device are provided. These communication mechanisms include use of Vendor Defined Messages (VDM) and Vendor-Specific Extended Capability (VSEC) structures that are used to exchange information between a host and a PCIe device to effect changes to the L1.2-exit time used by the PCIe device.

Vendor Defined Message Exchange to Effect L1.2 Exit Time

Under a first approach, a Vendor Defined Message exchange scheme is implemented to dynamically configure L1.2 exit times during run-time. The PCIe specification enable vendors to add enhancements and features through use of Vender Defined Messages. In PCIe 4.0, these are referred to as "Vendor_Defined Messages," and defined in section 2.2.8.6. The Vendor Defined Messages allow expansion of PCI Express messaging capabilities, either as a general extension to the PCI Express Specification or a vendor-specific extension.

FIG. 2 shows a table specifying aspects of Vendor Defined Messages, which use the header format shown in FIG. 3. As defined in PCIe 4.0 section 2.2.8.6, The Requester ID is implementation specific. It is strongly recommended that the Requester ID field contain the value associated with the Requester.

If the Route by ID routing is used, bytes 8 and 9 form a 16-bit field for the destination ID otherwise these bytes are Reserved.

Bytes 10 and 11 form a 16-bit field for the Vendor ID, as defined by PCI-SIG®, of the vendor defining the Message.

Bytes 12 through 15 are available for vendor definition.

As an option, PCI-SIG-Defined VDMs may be used. As defined in PCIe 4.0 section 2.2.8.6.1, PCI-SIG-Defined VDMs are Vendor-Defined Type 1 Messages that use the PCI-SIG® Vendor ID (0001h). As a Vendor-Defined Type 1 Message, each is silently discarded by a Completer if the Completer does not implement it.

Beyond the rules for other Vendor-Defined Type 1 Messages, the following rules apply to the formation of the PCI-SIG-Defined VDMs:

PCI-SIG-Defined VDMs use the Header format shown in FIG. 4.

The Requester ID field must contain the value associated with the Requester.

The Message Code must be 01111111b.

The Vendor ID must be 0001h, which is assigned to the PCI-SIG.

The Subtype field distinguishes the specific PCI-SIG-Defined VDMs.

FIG. 5 shows a system architecture 500 that may be used to implement a host-initiated change to the L1.2 exit time, according to one embodiment. System architecture 500 includes host SoC host 502 linked in communication with a PCIe endpoint device 504 via a PCIe link 506. Generally, PCIe link 506 represents a PCIe link defined under a PCIe 3.x or later specification, and may employ any lane width defined in such a specification, such as ×2, ×4, ×8, ×16, ×32, etc. In addition, PCIe link 506 may operate an any speed defined by a PCIe 3.x or later specification.

SoC host 502 includes a system management unit 508, a host application layer 510, a PCIe root complex (RC) 512 and a PCIe root port 514. Host application layer 510 includes a copy of a Tpower_on capability table 516, a VDM generator 518, and a VDM receiver 520. PCIe root port 514 includes a standard PCIe stack 522, including a transaction layer (TL), a data link layer (DL), and a physical layer (PL).

PCIe endpoint device 504 includes a PCIe port 524 and a device application layer 526. PCIe port 524 includes a standard PCIe stack that is shown split between PCIe PL and DL layers 528 and a PCIe transaction layer 529, which includes an L1 PM Substates capabilities register 530, an L1 PM Substates control 1 register 532. and an L1 PM Substates control 2 register 534. Device application layer 526 includes a VDM receiver 536 and a VDM generator 538.

In some embodiments, host application layer 510 may be implemented in PCIe root port 514, while in other embodiments host application layer 510 may be implemented in a separate block that is in communication with PCIe root port 514. Similarly, in some embodiments device application layer 526 may be implemented in PCIe port 524, while in other embodiments device application layer 526 may be implemented in a block that is in communication with PCIe port 524.

Figure 6:
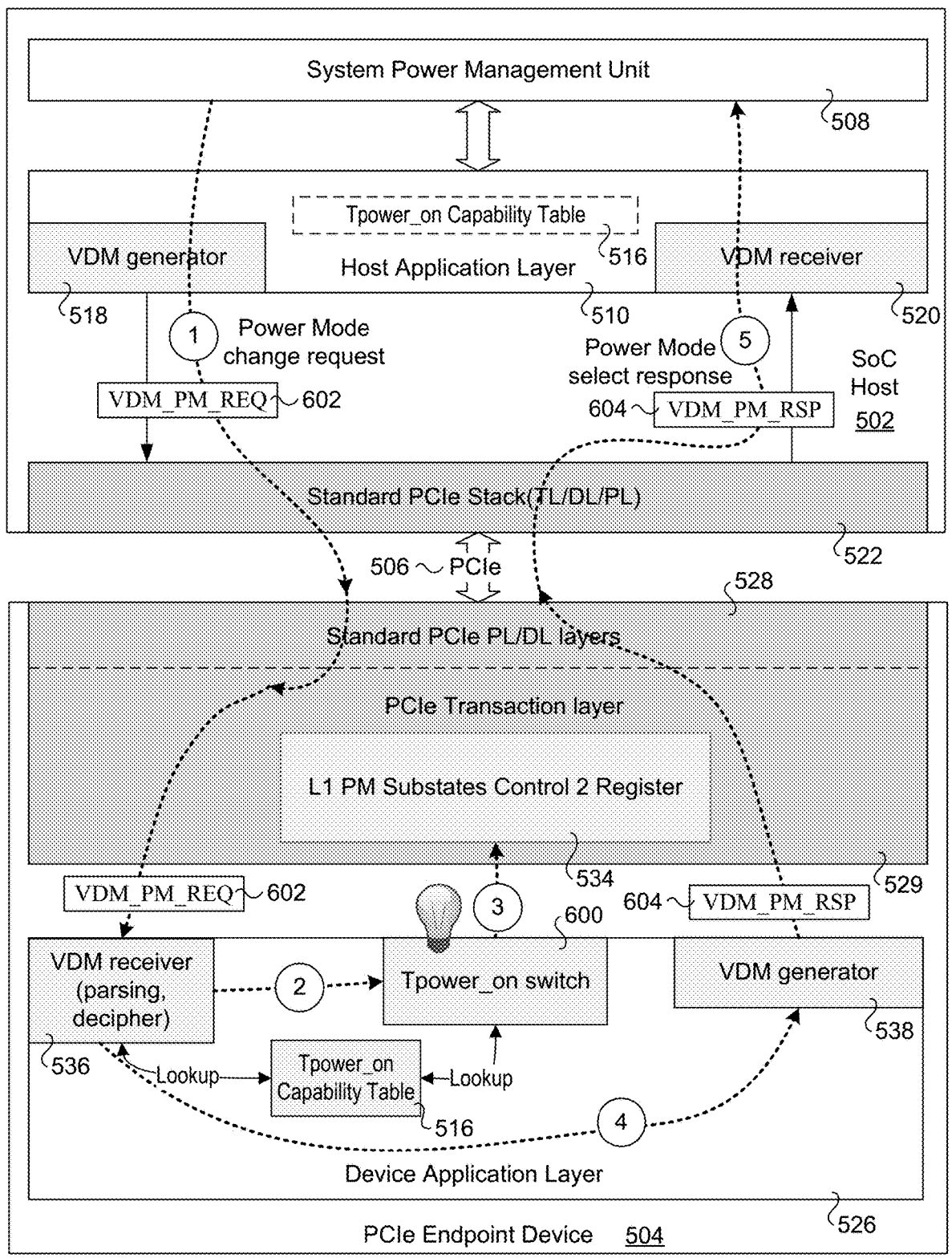
FIG. 6 is a message flow diagram illustrating further details of the system architecture of FIG. 5 along with message flows between components.

FIG. 6 shows message flows between selected components of architecture 500 that are used to implement a Tpower-on selection scheme using VDMs. The selected components include system power management unit 508, VDM generator 518 and VDM receiver 520 in host application layer 510, standard PCIe state 522, PCIe link 506, standard PCIe PL and DL layers 528, L1 PM Substates Control 2 Register 534 in PCIe transaction layer 529, and VDM receiver 536 and VDM generator 528 in device application layer 526. In addition, a Tpower_on switch 600 is also depicted in device application layer 526.

As used herein, a VDM generator is a component implemented in host or device application layer to compose VDMs and present them to a standard PCIe Transaction layer for transmission. A VDM receiver is a component implemented in a host or device application layer that receives VDMs from a standard PCIe Transaction layer, parses (and if needed, decipher) them, and notifies adjacent blocks. The L1 PM Substates Control 2 Register is part of the L1 PM Substates Extended Capability Structure defined in that PCIe specification at either the host PCIe root controller or root port or endpoint device PCIe stack, as shown in FIG. 1. A Tpower_on Switch is a component in the host or device application layer to resolve the final values to override T_POWER_ON_SCALE and T_POWER_ON_VALUE in the L1 PM Substates Control 2 Register, effectively changing the L1.2 exiting time for the Host/Device PCIe stack.

Generally, under the schemes illustrated in FIGS. 5 and 6, SoC host 502 and PCIe endpoint device 504 employ an application layer agreement on how the Tpower_on timing information is packaged via standard VDM packets. The message flows are depicted by encircled numbers 1-5 in FIG. 6 and proceeds as follows.

As depicted by message flow 1, System Power Management Unit 508 finds out there is a need to change the power mode of the device to an L1.2 Substate, and composes a VDM_PM_REQ message 602 at host application layer 510 as a "Power Mode change request" with the configuration information targeting Tpower_on switch 600. In one embodiment, VDM_PM_REQ message 602 includes a new power mode value using the power mode values defined in Tpower_on capability table 516.

As shown in FIG. 5, in the illustrated embodiment Tpower_on capability table 516 includes an L1.2 Substates power modes column 540, a selected T_POWER_ON_SCALE column 542, a selected T_POWER_ON_VALUE column 544, and a selected Tpower_on (μs) column 546. L1.2 Substates power modes column 540 contains a list of L1.2 Substates power modes that are supported, as depicted by mode_1, mode_2, . . . mode_n. T_POWER_ON_SCALE column 542 contains 2-bit values that are to be used for T_POWER_ON scale field 102 in L1 PM Substates Control 2 Register 534. Similarly, T_POWER_ON_VALUE column 544 contains 5-bit values that are to be used for T_POWER_ON value field 104 in L1 PM Substates Control 2 Register 534. Selected Tpower_on (μs) column 546 contains the L1.2 exit time in microseconds (μs). Tpower_on (μs) column 546 is shown in gray to indicate this data is optional; this column is included in FIG. 5 for illustrative purposes, and generally would not be used in an actual implementation, although it may be used. In addition to the range of L1.2 exit time values supported under the PCIe 4.0 Specification, additional L1.2 exit time values that are above the range may be supported.

Tpower_on capability table 516 (or a similar data structure) is stored in device application layer 526 on PCIe endpoint device, or otherwise stored on the PCIe endpoint device in manner that enables the device application layer to access the table or data structure. It will be recognized by those skilled in the art that different types of data structures may be used to support the functionality of the Tpower_on capability tables described herein, wherein such data structures would either include explicit data or be configured in a manner that associated T_POWER_ON_SCALE and T_POWER_ON_VALUE values with a corresponding power mode or indicia corresponding to a power mode. For example, for N different power modes, and N×3 array could be used. Optionally, an N×2 array could be used if the power mode indicia is an integer that is used as an index into the N×2 array. As another variant of an N×2 array, the first data in each row equivalent of the array could include the power mode, and the second data could comprise a data structure such as an object that includes both of the T_POWER_ON_SCALE and T_POWER_ON_VALUE values. Using the index scheme and a similar data structure, a Tpower_on capability table having an N×1 structure could also be used. Additionally, the power mode indicia could be a pointer or an address corresponding to a row equivalent in the data structure or array of data structures. Other types of data structures, such as linked-lists may also be used.

As yet another option, the T_POWER_ON_SCALE and T_POWER_ON_VALUE values for respective power modes could be stored in separate registers, or multiple sets of T_POWER_ON_SCALE and T_POWER_ON_VALUE values could be stored in the same register using a predetermined offset scheme. For example, a common register size is 32-bits, which is suitable for storing one Double Word (DW) or data. As the T_POWER_ON_SCALE field is 2-bits, and the T_POWER_ON_VALUE field is 5-bits, a single 32-bit register could be used to store four sets of T_POWER_ON_SCALE and T_POWER_ON_VALUE values.

Figure 7:
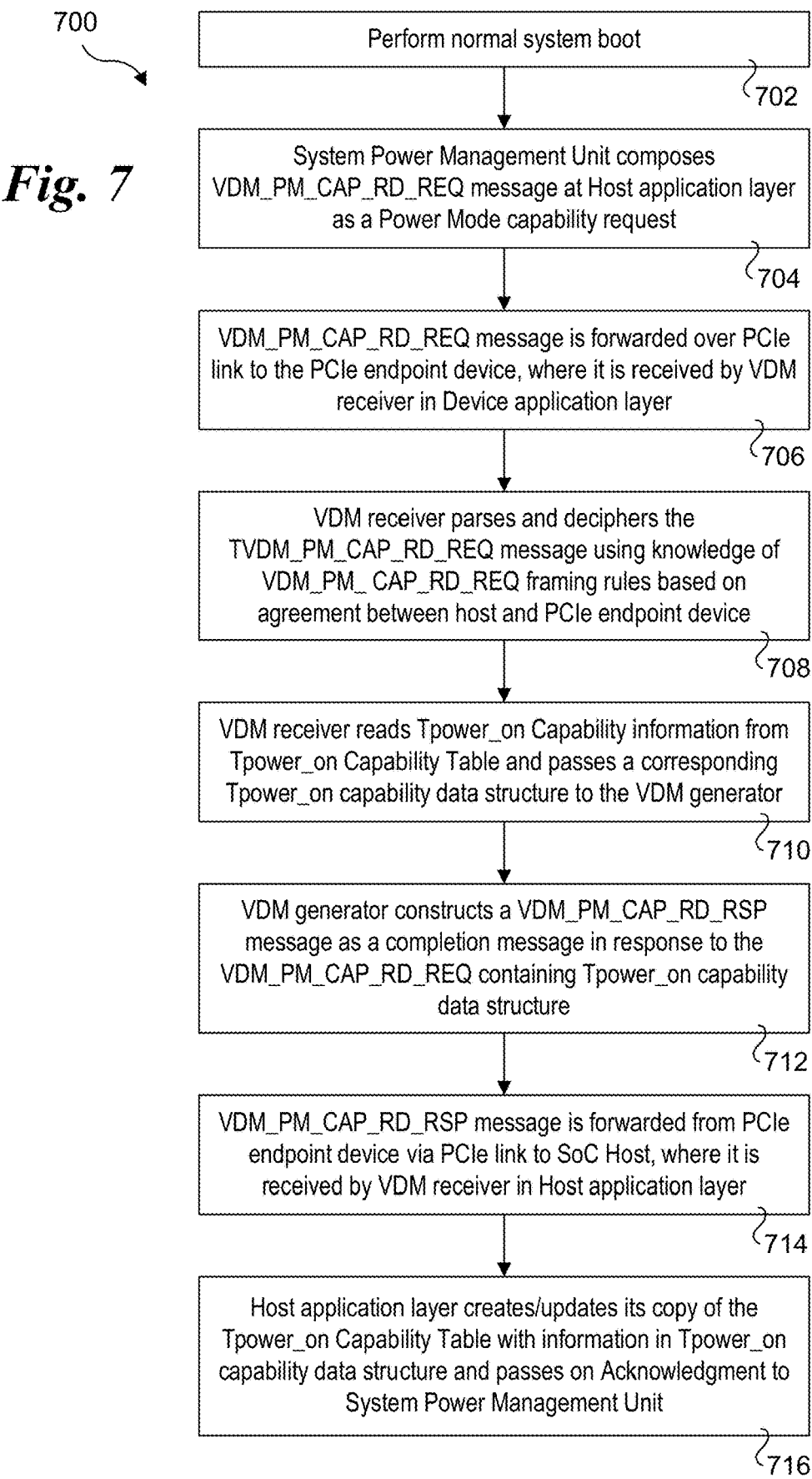
FIG. 7 is a flowchart illustrating operations performed by components in the message flow diagram of FIG. 8 to obtain Tpower_on capability for a PCIe device, according to one embodiment using VDMs.

As explained below with reference to FIG. 7, prior to the message flow and associated operations of FIG. 6, host application layer 510 will issue a read request to obtain a copy of the data in Tpower_on capability table 516 to enable host application layer 510 to generate its own copy of Tpower_on capability table 516 (or equivalent data). Generally, the copy of the data may be returned using data structures that are compatible with the data structures used to store the Tpower_on capability table data.

Since both host application layer 510 and device application layer 526 both have a copy of Tpower_on capability table 516 (or otherwise have access to either the Tpower_on capability table or its data), the only information that needs to be passed in VDM_PM_REQ message 602 is a new power mode value (e.g., one of mode_1, mode_2, . . . mode_n values). In one embodiment, this new power mode value can be conveyed via data located at a predetermined location (per the application layer agreement) in the Vendor Definition field (Byte 12-Byte 15) of the VDM header format in FIG. 3. Generally, data in the VDM messages (or selected fields in the VDM messages) used herein may or may not be encrypted, depending on the particular implementation and the requirements of the implementation environment. In one embodiment, use of encryption will be identified in the application layer agreement.

Returning to FIG. 6, VDM_PM_REQ message 602 is processed by the transaction, data link, and physical layers in standard PCIe stack 522 on SoC host 502, transferred over PCIe link 506, and processed by standard PCIe PL/DL layers 528 and PCIe transaction layer 529 on PCIe endpoint device 504. Upon completing its processing. PCIe transaction layer 529 forwards VDM_PM_REQ message 602 it to VDM receiver 536 in device application layer 526. at application layer. VDM receiver 536 has the knowledge (based on the application layer agreement) of the VDM_PM_REQ framing rules, and decodes VDM_PM_REQ message 602 to extract the power mode value.

At this point, VDM receiver 536 provides instructions to Tpower_on switch 600 to effect the power mode corresponding to the extracted power mode value, as depicted by message flow 2. There are two schemes illustrated in FIG. 6 for this operation. Under a first scheme, VDM receiver 536 uses the power mode value as a lookup into Tpower_on capability table 516 to retrieve the T_POWER_ON_SCALE and the T_POWER_ON_VALUE entries in the row corresponding to the power mode value. The corresponding T_POWER_ON scale value and the T_POWER_ON values are included as part of the instructions sent to Tpower_on switch 600 in message flow 2. Under a second scheme, the power mode value is passed to Tpower_on switch 600 via message flow 2, and Tpower_on switch 600 uses the power mode value to perform a lookup into Tpower_on capability table 516 to retrieve the T_POWER_ON_SCALE and the T_POWER_ON_VALUE entries from the table.

As depicted by message flow 3, Tpower_on switch 600 updates the T_POWER_ON Scale 102 and the T_POWER_ON Value 104 L1 PM Substates Control 2 Register 534 with the T_POWER_ON_SCALE and the T_POWER_ON_VALUE entries either passed to it by VDM receiver 536 or retrieved from Tpower_on capability table 516 by Tpower_on switch 600. Generally, there are various ways for an application layer to update the PCIe stack registers, including an L1 PM Substates Control 2 Register. One example is to override the T_POWER_ON Scale 102 and the T_POWER_ON Value 104 that was originally configured by the host during normal enumeration, but this is not to be limiting, as the particular mechanism used to update the L1 PM Substates Control 2 Register is outside the scope of the invention.

As depicted by message flow 4, VDM receiver 536 notifies VDM generator 538 to construct a VDM_PM_RSP message 604 with optional encryption as a completion message in response to VDM_PM_REQ message 602. As depicted by message flow 5, VDM_PM_RSP message 604 is processed by the PCIe transaction layer 529 and standard PCIe PL/DL layers 528, transferred over PCIe link 506, and then processed by the layers in standard PCIe stack 522 on SoC host 602 and forwarded to VDM receiver 520, where it is parsed to extract the completion acknowledgement information. Host application layer 510 then will pass the acknowledge information to system power management unit 508, which concludes the power mode L1.2 exit time change process.

During ongoing operations following this process, PCIe endpoint device 504 may enter the L1.2 Substate. Subsequently, when exiting the L1.2 Substate, the exit time will conform to the new L1.2 Substate exit time set through use of VDM_PM_REQ message 602.

Obtaining PCIe Device L1.2 Substate Capabilities

In the foregoing host-initiated scheme, the SoC host and PCIe endpoint device each have a copy of a Tpower_on capability table (or similar data structure), and use data from the table to effect L1.2 exit time changes. One aspect of this approach is that the VDM_PM_REQ message only need to covey information identifying the power mode to be implemented at the PCIe endpoint device. Another important aspect of this approach is that the host application layer (or any other software or hardware for an SoC host) does not need to be programmed in advance with information concerning the PCIe endpoint device L1.2 Substate capabilities. Rather, the capability information is obtained by the SoC host from the PCIe endpoint device prior to using it in the VDM_PM_REQ message. In one embodiment, the capability information is obtained in the following manner, with reference to the flowchart 700 of FIG. 7 and the message flow diagram of FIG. 8.

The process begins in a block 702, where the system performs normal system boot operations. This will include operations relating to PCIe interconnect hierarchy discovery and PCIe device enumeration under which the host operating system will identify and configure various PCIe devices.

Figure 8:
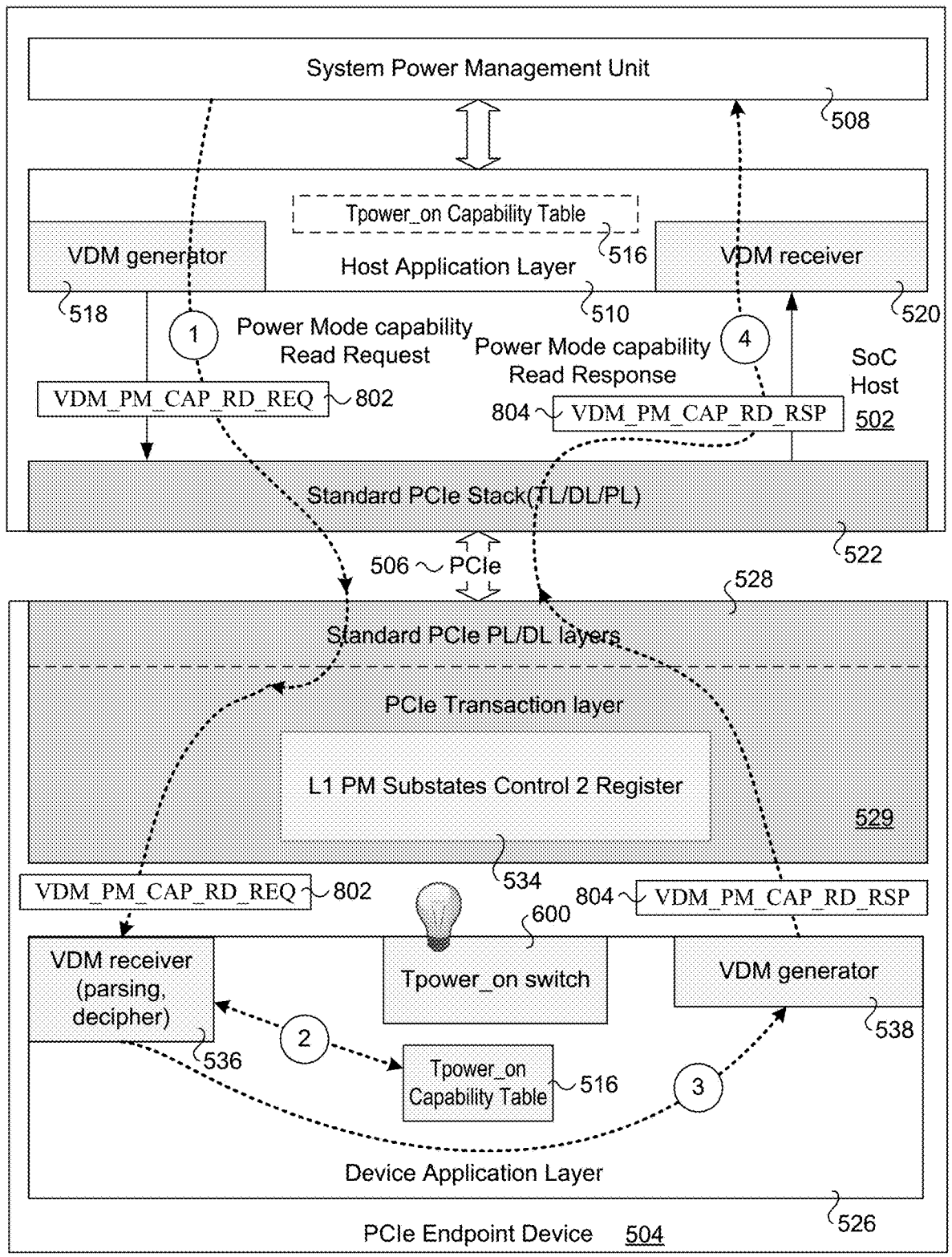
FIG. 8 is a message flow diagram illustrating message flows in accordance with corresponding operations depicted in the flowchart of FIG. 7.

Next, the System Power Management Unit starts exploring the additional Tpower_on capability at the device side by composing a VDM_PM_CAP_RD_REQ message 802 at Host application layer 510 as a "Power Mode capability read request," as depicted in a block 704 and in the upper portion of FIG. 8. As before, VDM_PM_CAP_RD_REQ message 802 may or may not be encrypted, depending on the particular implementation and/or security requirements.

As depicted by message flow 1 in FIG. 8 and the operation in block 706, VDM_PM_CAP_RD_REQ message 802 is forwarded over PCIe link 506 to PCIe endpoint device 504, where it is received by VDM receiver 536 in device application layer 526. In a block 708, VDM receiver 536 parses and deciphers TVDM_PM_CAP_RD_REQ message 702 using knowledge of VDM_PM_CAP_RD_REQ framing rules based on the previously established agreement between host and PCIe endpoint device.

In a block 710, VDM receiver 536 reads the Tpower_on Capability information from Tpower_on capability table 516 and passes a corresponding Tpower_on capability data structure or the like to VDM generator 538. This is schematically depicted by message flows 2 and 3 in FIG. 8. VDM generator 538 then constructs a VDM_PM_CAP_RD_RSP message 804 as a completion message in response to the VDM_PM_CAP_RD_REQ message 802 containing the Tpower_on capability data structure, as depicted in a block 712.

As depicted in a block 714 and by message flow 4 in FIG. 8, VDM_PM_CAP_RD_RSP message 804 is forwarded from PCIe endpoint device 504 via PCIe link 506 to SoC Host 502, where it is received by VDM receiver 520 in Host application layer 510. The process is completed in a block 716, where Host application layer 510 creates/updates its copy of Tpower_on capability table 516 with information in Tpower_on capability data structure and passes on acknowledgment to system power management unit 508.

Figure 9:
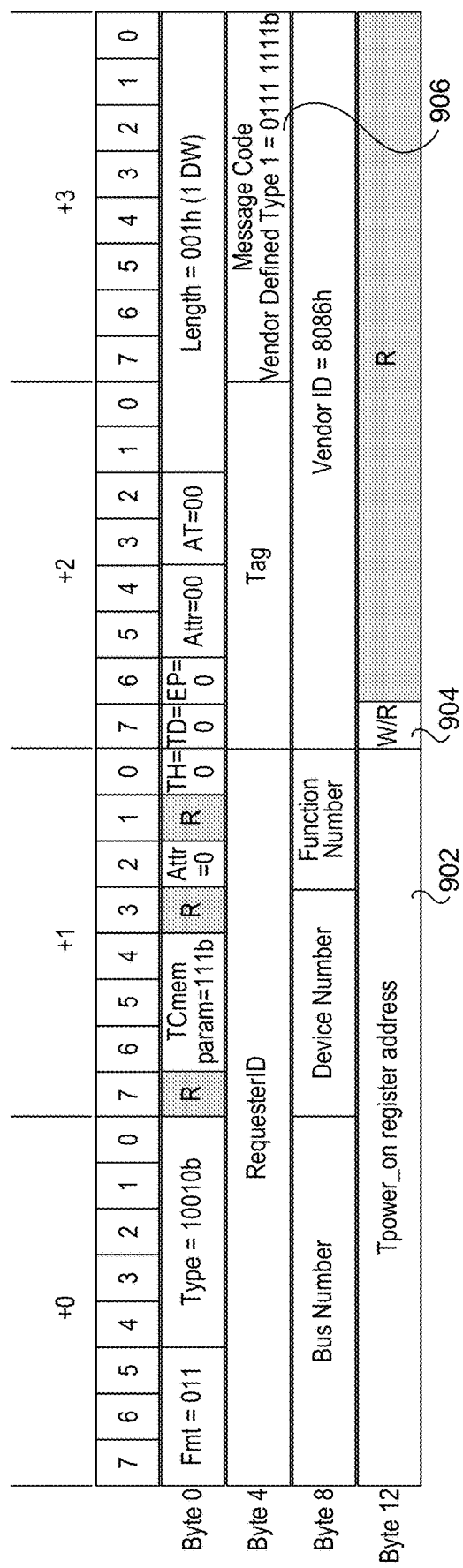
FIG. 9 is diagram illustrating an example of a VDM frame definition, according to one embodiment.

FIG. 9 shows an example of a VDM frame definition 900, according to one embodiment. VDM frame definition 900 generally follows the VDM header format of FIG. 3, while further depicting selected fields populated with vendor-specific or function-specific data. These data include a Tpower_on register address 902, a Write/Read (W/R) flag 904, and a vendor defined message code 906. Additional VDM frame definitions corresponding to different VDM messages may be defined in a similar manner.

Vendor-Specific Extended Capability (VSEC) to Effect L1.2 Exit Time

Under another approach, The PCI Express Vendor-Specific Extended Capability (VSEC) is used to effect changes to the L1.2 Substate exit time during run-time operations. The PCI Express VSEC is an optional Extended Capability that is permitted to be implemented by any PCI Express Function or RCRB (Root Complex Register Block). This allows PCI Express component vendors to use the Extended Capability mechanism to expose vendor-specific registers.

Details of the VSEC structure and shown in FIG. 10-12. FIG. 10 details allocation of register fields in a VSEC structure 1000, as defined by section 7.9.5 of the PCIe 4.0 Specification. VSEC structure 1000 includes a PCI Express extended capability header 1002, a vendor-specific header 1004, and vendor-specific registers 1004.

As shown in FIG. 11, PCI Express extended capability header 1002 includes a 16-bit (15:0) PCI Express Extended Capability ID field, a 4-bit (19:16) Capability Version field, and a 12-bit (31:20) Next Capability Offset field. The PCI Express Extended Capability ID field is a PCI-SIG defined ID number that indicates the nature and format of the Extended Capability, which has a value of 000Bh for a vendor-specific extended capability. The Capability Version field is a PCI-SIG defined version number that indicates the version of the Capability structure present. The Next Capability Offset field contains the offset to the next PCI Express Capability structure or 000h if no other items exist in the linked list of Capabilities. For Extended Capabilities implemented in Configuration Space, this offset is relative to the beginning of PCI-compatible Configuration Space and thus must always be either 000h (for terminating list of Capabilities) or greater than OFFh.

The format of vender-specific header 1004 is shown in FIG. 12. As illustrated, the vender-specific header format includes a 16-bit (15:0) VSEC ID field, a 4-bit (19:16) VSEC Rev field, and a 12-bit (31:20) VSEC Length field. The VSEC ID field includes a vendor-define ID number that indicates the nature and format of the VSEC structure. The VSEC Rev field contains a vendor-defined version number that indicates the version of the VSEC structure, while the VSEC Length field indicates the number of bytes in the entire VSEC structure, including the PCI Express Extended Capability header, the vendor-specific header, and the vendor-specific registers. Vendor-specific software must qualify the associated Vendor ID of the PCI Express Function or RCRB before attempting to interpret the values in the VSEC ID or VSEC Rev fields.

Figure 13A:
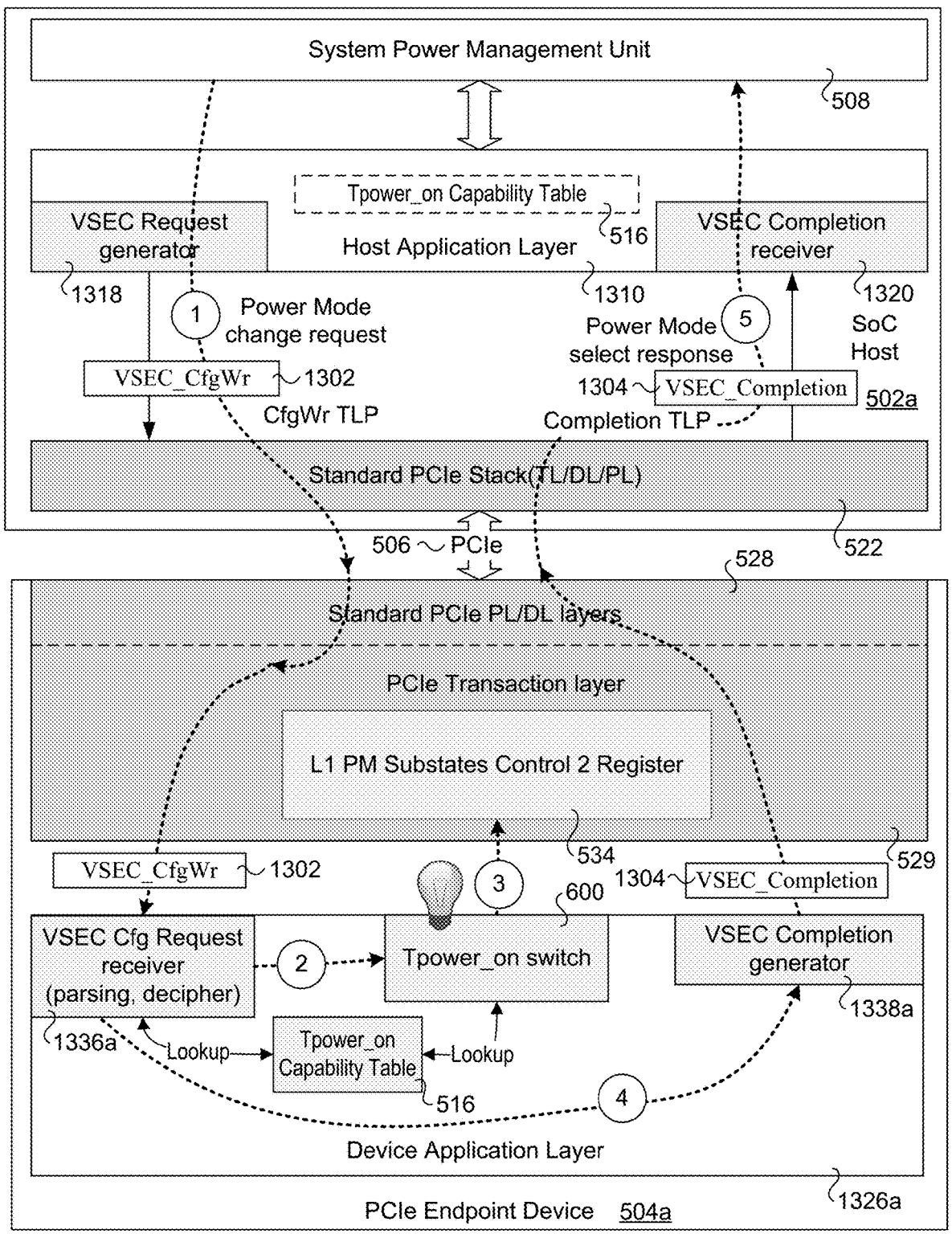
FIG. 13a is message flow diagram for changing L1.2 Substate exit time using VSEC structure using a PCIe endpoint device in which a VSEC Cfg Request receiver and VSEC Completion generator are implemented in the Device application layer.
Figure 13B:
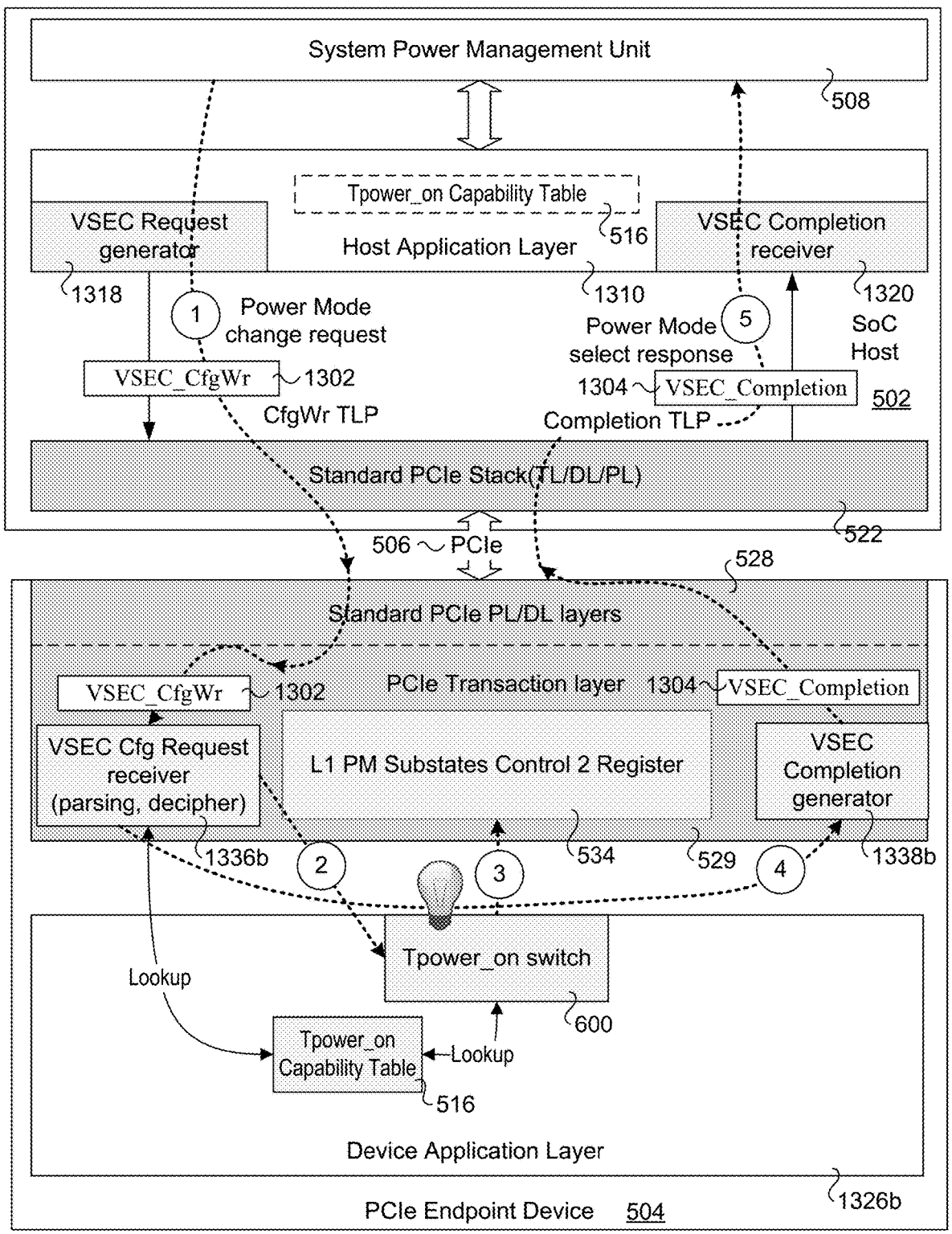
FIG. 13b is a message flow diagram for changing L1.2 Substate exit time using VSEC structure using a PCIe endpoint device in which a VSEC Cfg Request receiver and VSEC Completion generator are implemented in the Transaction layer of the PCIe endpoint device.

FIGS. 13a and 13b show message flow diagrams corresponding to respective VSEC embodiments for setting/updating the T_POWER_ON Scale 102 and the T_POWER_ON Value 104 values. The message flow patterns of FIGS. 13a and 13b are similar to that illustrated above in FIG. 6, wherein components with common reference numbers in FIGS. 6, 13a, and 13b are configured to perform similar operations. Accordingly, the following will focus on differences between the VSEC approaches in FIGS. 13a and 13b and the VDM approach illustrated in FIG. 6.

With reference to FIG. 13a, SoC Host 502a has a host application layer 1310 that includes a VSEC Request generator 1318 and a VSEC Completion receiver 1320. On PCIe endpoint device 504a, device application layer 1326 includes a VSEC Cfg Request receiver 1336a and a VSEC Completion generator 1338. As depicted by message flow 1, VSEC Request generator 1318 generates a VSEC_CfgWr TLP 1302 containing information identifying the power mode to be implemented that is sent to PCIe endpoint device 504a. VSEC_CfgWr TLP 1302 is a CfgWr TLP that is processed in the conventional manner by the PCIe stacks on the host and PCIe endpoint device, following by VEC_CfgWr TLP 1302 being forwarded from PCIe transaction layer 529 to VSEC Cfg Request receiver 1336a. Upon receiving VEC_CfgWr TLP 1302, it is parsed and deciphered to extract the power mode, followed by VSEC Cfg Request receiver 1336a performing a lookup of Tpower_on capability table 516 to obtain the T_POWER_ON Scale value and the T_POWER_ON Value value for the power mode. The T_POWER_ON Scale value and the T_POWER_ON Value value are then sent to Tpower_on switch 600, as depicted by message flow 2. As an option, the Tpower_on switch can be provided with the power mode in message flow 2, and perform the T_POWER_ON Scale value and the T_POWER_ON Value value lookup, as shown.

As with the VDM embodiment of FIG. 6, Tpower_on switch then writes these values to the T_POWER_ON Scale field and the T_POWER_ON Value field in L1 PM Substates Control 2 Register 534. As depicted by message flow 4, VSEC Cfg Request receiver 1336a notifies VSEC Completion generator 1338a to construct a VSEC completion TLP 1304 with optional encryption as a Completion in response to VEC_CfgWr TLP 1302. As depicted by message flow 5, VSEC completion TLP 1304 is processed by the PCIe transaction layer 529 and standard PCIe PL/DL layers 528, transferred over PCIe link 506, and then processed by the layers in standard PCIe stack 522 on SoC host 602a and forwarded to VSEC completion receiver 1320, where it is parsed to extract the Completion information. Host application layer 1310 then will pass information indicating the power mode change has been completed, such as an acknowledgment or other indicia, to system power management unit 508, which concludes the power mode L1.2 exit time change process.

The message flow for the VSEC embodiment illustrated in FIG. 13b is substantially similar to that shown in FIG. 13a, except the VSEC Cfg Request receiver (now labeled 1336b) and VSEC Completion generator (now labeled 1338b) are implemented in PCIe transaction layer 529 rather than device application layer 1326a. Tpower_on switch 600 and Tpower_on capability table 516 remain in the device application layer, now labeled 1326b.

Figure 14:
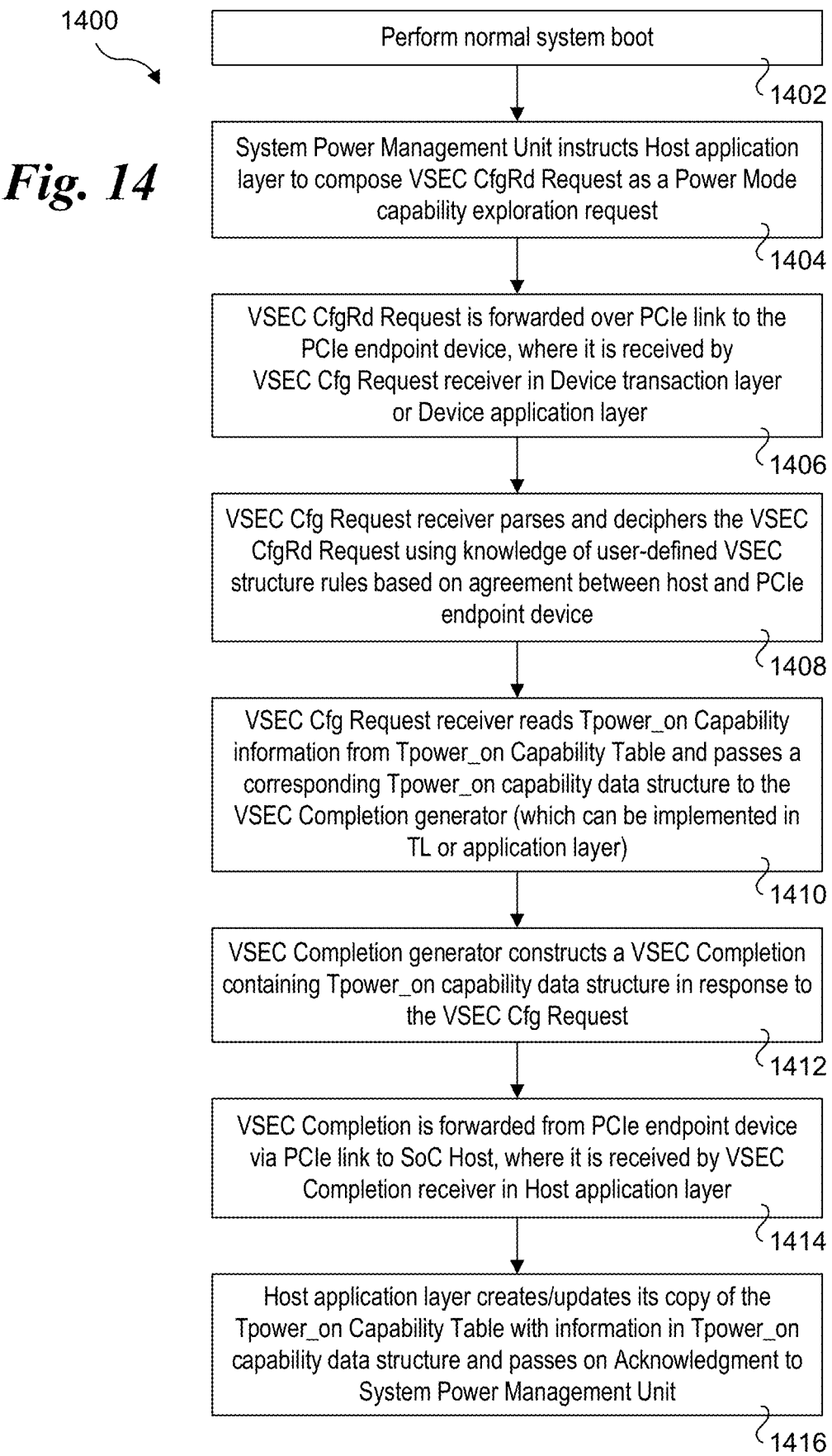
FIG. 14 is a flowchart illustrating operations performed by components in the message flow diagrams of FIG. 13a or 13b to obtain Tpower_on capability for a PCIe device, according to one embodiment using VSEC structures.

FIG. 14 shows a flowchart 1400 illustrating operations for obtaining the power capability information from Tpower_on capability table 516. As with flowchart 700 of FIG. 7, the process starts with a normal system boot 1402. In a block 1404, the system power management unit 508 instructs host application layer 1310 to compose a VSEC CfgRd request as a power mode capability exploration request. As depicted in a block 1406 The VSEC CfgRd request is then forward from the host over the PCIe link to the PCIe endpoint device, where it is received by the VSEC Cfg Receiver in the device transaction layer (i.e., PCIe transaction layer 529) or the Device application layer, depending on whether the system configuration of FIG. 13a or 13b is being used.

In a block 1408, the VSEC Cfg Request receiver parses and deciphers the VSEC CfgRd Request using knowledge of user-defined VSEC structure rules based on agreement between host and PCIe endpoint device. As depicted by a block 1410, the VSEC Cfg Request receiver then reads Tpower_on Capability information from Tpower_on capability table and passes a corresponding Tpower_on capability data structure to the VSEC Completion generator (which can be implemented in PCIe device's transaction layer or application layer). In a block 1412, the VSEC Completion generator constructs a VSEC Completion containing a Tpower_on capability data structure that is returned as a Completion TLP in response to the VSEC Cfg Request.

In a block 1414, the VSEC Completion is forwarded from PCIe endpoint device via the PCIe link 506 to SoC Host 502a, where it is received by VSEC Completion receiver 1320 in Host application layer 1310. The process is completed in a block 1416, in which Host application layer 1310 creates/updates its copy of the Tpower_on capability table 516 with information in the Tpower_on capability data structure and passes on an Acknowledgment to system power management unit 508.

As the VSEC length is not limited by the PCIe 4.0 Specification, a PCIe endpoint device can implement sufficient R/W registers for as many power modes as necessary into this VSEC structure. In a similar way to that illustrated in FIG. 6 and discussed above, a VSEC structure can be used to configure each entry of the Tpower_on capability table 516 For example, if a host-device agreement is available, the host can choose to configure the PCIe endpoint device VSEC structure to achieve the Tpower-on change via one or more pair of CfgRd/CfgWr TLP (configuration read and configuration write transaction layer) handshakes. Under the PCIe 4.0 Specification, each of a CfgRd and CfgWr can carry a single DW(32-bit) payload of data. As a result, obtaining the Tpower_on capability data may require multiple pairs of CfgRd/CfgWr TLP exchanges between a host and a PCIe device.

Also, in a manner similar to that described above for the VDM exchange scheme, the VSEC scheme may be implemented in a very efficient and secure manner. For example, if the "Tpower_on Switch" pre-setup can be done by using a scheme similar to that illustrated in FIGS. 13*a* and 13*b*, then a VSEC structure would only need to include data indicating the Power Mode setting, such that a single VSEC could be used to set the PCIe endpoint device to a particular power mode, which will in turn automatically update the Tpower_on parameter used for the device's subsequent PCIe L1.2 Substate exit time.

Figure 15:
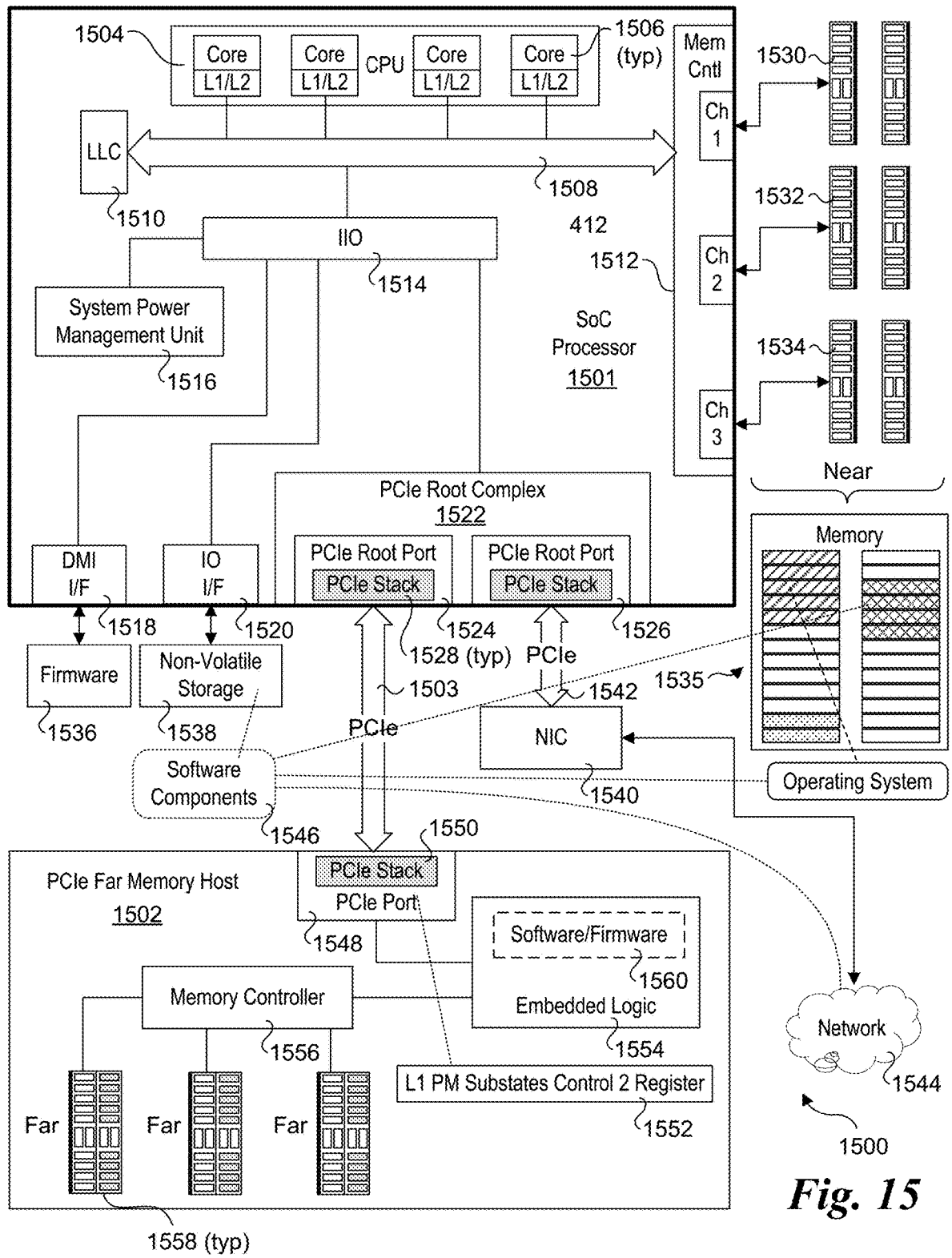
FIG. 15 is a diagram of a system configured to implement a two-level memory (2LM) scheme, and further configured to implement changes to the L1.2 exit time in accordance with aspects of the embodiments disclosed herein.

FIG. 15 shows a system 1500 configured to implement aspects of the embodiments herein. System 1500 includes a SoC processor 1501 coupled to a PCIe far memory host 1502 via a PCIe link 1503. SoC processor 1501 includes a central processing unit (CPU) 1504 including a plurality of processor cores 1506, each with a respective L1 and L2 cache. Each of the processor cores 1506 is connected to an interconnect 1508 to which a last level cache (LLC) 1510, a memory controller 1512, and an integrated input-output (ITO) block 1514 is coupled.

IIO block 1514 provides an interface between various components and interconnect 1508. These components include a system power management unit 1516, a DMI interface (I/F) 1518, an IO interface 1520, and a PCIe root complex 1522. PCIe root complex 1522 has a plurality of PCIe root ports, including PCIe root ports 1524 and 1526, each having a respective PCIe stack 1528.

Memory controller 1512 generally will include one or more memory channels coupled to random access memory devices. In the example illustrated in FIG. 15, memory controller 1512 includes three memory channels Ch 1, Ch 2, and Ch 3, each coupled to one or more DRAM DIMMs (dual in-line memory modules), as depicted by DRAM DIMMs 1530, 1532, and 1534. The DRAM DIMMs collectively comprise "near" system memory 1535.

DMI interface 1518 is connected to a firmware storage device 1538 in which firmware is stored, such as but not limited to a Flash memory device. Generally, the firmware is used to boot the system and support various run-time operations at the firmware level. IO interface 1520 is connected to a non-volatile storage device 1538, such as a solid state disk (SSD), although any time of non-volatile storage device may be used, including a magnetic disk drive, optical disk drive, etc.

PCIe root port 1526 is connected to a network interface controller (NIC) 1540 via a PCIe link 1542. NIC 1540, in turn, is configured to be connected to a network 1544 when system 1500 is operating. For example, in some embodiments, system 1500 is a server blade or server module configured to be implemented in a chassis or the like in a rack in a data center.

System 1500 further includes software components 1546. Generally, the software components may include an operating system and application software. The operating system will generally include various device drivers, including device drivers that may be added to an operating system (if not provided with the operating system when deployed). Various portions of the software components may reside on or otherwise be accessed from non-volatile storage 1546 or network 1544. For example, in some embodiments the software components will be stored on an SSD or the like, and access from the SSD and loaded into system memory 1535 during run-time operations. In other embodiments, various software components may be accessed over network 1544, and subsequently loaded into system memory 1535.

PCIe far memory host 1502 is a PCIe endpoint device configured to implement one or more embodiments of the L1.2 exit time schemes described herein. It includes a PCIe port 1548 implementing a PCIe stack 1550. Generally, PCIe port 1548 may be configured in a similar manner to PCIe port 524 of FIG. 5 discussed above. As with FIG. 5, PCIe port 1548 includes an L1 PM Substates Control 2 Register 1552.

PCIe far memory host 1502 further includes embedded logic 1554 coupled to PCIe port 1548 and a memory controller 1556. Memory controller 1556 is coupled to a plurality of Non-Volatile DIMMs (NVDIMMs) 1558, which in one embodiment comprise 3D)(Point® NVDIMMs from Intel® Corporation.

Embedded logic 1554 is illustrative of any type of embedded logic using to implement the functionality of a PCIe endpoint device described herein. This includes hardware-based logic, software-based logic, or a combination of the two. For example, some of all of the functionality may be implemented using hardware-based logic, such as programmed logic components including but not limited to an FPGA (Field Programmable Gate Array) or an ASIC (Application Specific Integrated Circuit). Embedded logic 1554 may also be implemented by software and/or firmware executed on an embedded processor or one or more processing elements, as depicted by an optional software/firmware block 1560. Various types of processors may be used for such an embedded processor, including general-purpose processors, processor engines, microcontrollers, etc.

System 1500 is configured to support a two-level memory (2LM) scheme under which a first level of "near" memory is accessed by memory controller 1512 on SoC processor 1502, while a second level of "far" memory is accessed over PCIe link 1503. The 2LM scheme may implement aspects of the embodiments disclosed herein to change the L1.2 Substate exit time of PCIe far memory host 1502. For example, under different scenarios it may be advantageous to increase or decrease the L1.2 Substate exit time during ongoing operations.

The teachings and principles disclosed herein provide several advantageous over current approaches. They provides various options for a power-saving-capable system to introduce multiple much-finer-granularized power states for a L1.2-capable device, so that a system power architecture can be more optimized. The schemes fortify 2LM-related and other potential computing systems by hiding/encrypting critical power-mode information and preventing it from being exposed to potential competitors or malicious actors. Embodiments may be implemented though use of a host application layer and device application layer while otherwise using standard PCIe components and standard PCIe stacks. The embodiments also provide a generic mechanism to advertise and/or exchange dynamic system update needs from both a host and device endpoint point of view, depending on system architecture needs, during run-time operations.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic or a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B and C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for effecting changes to the Peripheral Component Interconnect Express (PCIe) L1.2 Substate exit time for a PCIe device having an L1 PM Substates Control 2 Register including a T_POWER_ON Scale field and a T_POWER_ON Value field, comprising:
    storing, on the PCIe device, a power mode capability table structure containing information mapping each of a plurality of respective power modes to a T_POWER_ON Scale value and a T_POWER_ON Value value;
    generating, at a host coupled to the PCIe device via a PCIe link, a power mode change request defining a power mode;

sending the power mode change request over the PCIe link to the PCIe device;

extracting, at the PCIe device, information identifying the power mode from the power mode change request; and identifying the T_POWER_ON Scale value and the T_POWER_ON Value value in the power capability table structure corresponding to the power mode that is extracted; and setting respective values in the T_POWER_ON Scale field and the T_POWER_ON Value field to the T_POWER_ON Scale value and the T_POWER_ON Value value that are identified to change the L1.2 Substate exit time to be used by the PCIe device.

2. The method of claim 1, further comprising returning a power mode change confirmation from the PCIe device to the host confirming the L1.2 Substate exit time has been changed.

3. The method of claim 2, wherein each of the power mode change request and the power mode change confirmation comprises a Vender Defined Message (VDM).

4. The method of claim 1, wherein each of the power mode change request and the power mode change confirmation comprises a Vender-Specific Extended Capability (VSEC) structure.

5. The method of claim 2, further comprising:

generating, at the PCIe device, a power mode change request response and sending the power mode change request response from the PCIe device over the PCIe link to the host;

processing, at a host application layer on the host, the power mode change request response; and sending information to a system power management unit that the change of the power mode of the PCIe device has been completed.

6. The method of claim 1, further comprising:

prior to generating and sending the power mode change request,
  obtaining power mode device capability information from the power mode capability table structure of the PCIe device; and
  using the power mode device capability information to select the power mode in the power mode change request.

7. The method of claim 6, further comprising:

sending a first Vendor Defined Message (VDM) comprising a power mode capability read request from the host to the PCIe device via the PCIe link;

reading the power mode capability table structure and generating power mode capability information;

returning the power mode capability information in a second VDM comprising a power mode capability read response sent from the PCIe device via the PCIe link to the host; and creating or updating a copy of the power mode capability table structure on the host.

8. The method of claim 6, further comprising:

sending a first Vender-Specific Extended Capability (VSEC) structure comprising a power mode capability read request from the host to the PCIe device via the PCIe link;

reading the power mode capability table structure and generating power mode capability information;

returning the power mode capability information in a second (VSEC) structure comprising a power mode capability read response sent from the PCIe device via the PCIe link to the host; and creating or updating a copy of the power mode capability table structure on the host.

9. A system comprising:

a host computer, including,
  a System on a Chip (SoC) processor having a memory controller and a Peripheral Component Interconnect Express (PCIe) root controller including at least one PCIe root port;
  system memory, operatively coupled to the memory controller; and
  instructions, to execute on the SoC processor;

a PCIe device, including,
  a PCIe port coupled to a PCIe root port via a PCIe link having a L1 PM Substates Control 2 Register including a T_POWER_ON Scale field and a T_POWER_ON Value field;
  a power mode capability table structure containing information mapping each of a plurality of respective power modes to a T_POWER_ON Scale value and a T_POWER_ON Value value; and
  embedded logic;

wherein execution of the instructions on the SoC processor and the embedded logic respectively enable the host computer and the PCIe device to, generate, at the host computer, a power mode change request defining a power mode;

send the power mode change request from the host computer over the PCIe link to the PCIe device;

extract, at the PCIe device, information identifying the power mode from the power mode change request;

retrieve a T_POWER_ON Scale value and a T_POWER_ON Value value in the power capability table structure for the power mode that is identified; and set respective values in the T_POWER_ON Scale field and the T_POWER_ON Value field to the T_POWER_ON Scale value and the T_POWER_ON Value value that are retrieved to change the L1.2 Substate exit time to be used by the PCIe device.

10. The system of claim 9, wherein the power mode change request comprises a Vender Defined Message (VDM).

11. The system of claim 9, wherein the power mode change requests comprises a Vender-Specific Extended Capability (VSEC) structure.

12. The system of claim 9, wherein execution of the instructions on the SoC processor implement a host application layer that is used to generate the power mode change request, wherein the embedded logic on the PCIe device is configured to implement a device application layer, and wherein the information identifying the power mode is extracted from the power mode change request by the device application layer.

13. The system of claim 9, wherein the host computer further includes a system power management unit either implemented in the SoC processor or coupled to the SoC processor, and wherein execution of the instructions on the SoC processor and the embedded logic respectively enable the host computer and the PCIe device to:

implement a host application layer on the host computer;

generate, at the PCIe device, a power mode change request response;

send the power mode change request response from the PCIe device over the PCIe link to the host computer;

process, at the host application layer, the power mode change request response; and send information to the system power management unit that the power mode change request has been completed.

14. The system of claim 9, wherein execution of the instructions on the SoC processor and the embedded logic respectively enable the host computer and the PCIe device to:

prior to generating and sending the power mode change request, obtain power mode device capability information from the PCIe device defining power modes supported by the PCIe device; and use the power mode device capability information to select the power mode in the power mode change request.

15. The system of claim 9, wherein execution of the instructions on the SoC processor and the embedded logic respectively enable the host computer and the PCIe device to: send a first Vendor Defined Message (VDM) comprising a power mode capability read request from the host to the PCIe device via the PCIe link; retrieve power mode capability information from the power mode capability table structure; return the power mode capability information in a second VDM comprising a power mode capability read response sent from the PCIe device via the PCIe link to the host; and create or update a copy of the power mode capability table structure on the host.

16. The system of claim 15, wherein execution of the instructions on the SoC processor and the embedded logic respectively enable the host computer and the PCIe device to:

send a first Vender-Specific Extended Capability (VSEC) structure comprising a power mode capability read request from the host to the PCIe device via the PCIe link;

retrieve power mode capability information from the power mode capability table structure;

return the power mode capability information in a second VSEC structure comprising a power mode capability read response sent from the PCIe device via the PCIe link to the host; and create or update a copy of the power mode capability table structure on the host.

17. The system of claim 9, wherein the embedded logic on the PCIe device includes at least one processing element on which at least one of software and firmware is executed.

18. A Peripheral Component Interconnect Express (PCIe) device, comprising:

a PCIe port configured to implement a PCIe stack including a physical layer, link layer, and transaction layer;

an L1 PM Substates Control 2 Register including a T_POWER_ON Scale field and a T_POWER_ON Value field; and embedded logic;

wherein the PCIe device is configured to be coupled to a host via a PCIe link coupled between the host and the PCIe port, and wherein the embedded logic is configured to, receive a power mode change request sent from the host over the PCIe link, the power mode change request including information identifying a power mode;

extract the information identifying the power mode from the power mode change request;

retrieve a T_POWER_ON Scale value and a T_POWER_ON Value value in the power capability table structure for the power mode that is identified; and set respective values in the T_POWER_ON Scale field and the T_POWER_ON Value field to the T_POWER_ON Scale value and the T_POWER_ON Value value that are retrieved to change the L1.2 Substate exit time to be used by the PCIe device.

19. The PCIe device of claim 18, wherein the embedded logic is further configured to return a power mode change confirmation to the host confirming the L1.2 Substate exit time has been changed.

20. The PCIe device of claim 19, wherein each of the power mode change request and the power mode change confirmation comprises a Vender Defined Message (VDM).

21. The PCIe device of claim 19, wherein each of the power mode change request and the power mode change confirmation comprises a Vender-Specific Extended Capability (VSEC) structure.

22. The PCIe device of claim 18, wherein the embedded logic is further configured to:

receive a first Vendor Defined Message (VDM) comprising a power mode capability read request sent from the host to the PCIe device via the PCIe link;

retrieve power mode capability information from the power mode capability table structure; and return the power mode capability information in a second VDM comprising a power mode capability read response sent from the PCIe device via the PCIe link to the host.

23. The PCIe device of claim 18, wherein the embedded logic is further configured to:

receive a Vender-Specific Extended Capability (VSEC) structure comprising a power mode capability read request sent from the host to the PCIe device via the PCIe link;

retrieve power mode capability information from the power mode capability table structure; and return the power mode capability information in a second (VSEC) structure comprising a power mode capability read response sent from the PCIe device via the PCIe link to the host.

24. The PCIe device of claim 18, wherein the embedded logic on the PCIe device includes at least one processing element on which at least one of software and firmware is executed.

* * * * *